(12) United States Patent
Wu

(10) Patent No.: US 10,145,734 B2
(45) Date of Patent: Dec. 4, 2018

(54) METHODS AND APPARATUS FOR A LIGHT SENSOR

(71) Applicant: SEMICONDUCTOR COMPONENTS INDUSTRIES, LLC, Phoenix, AZ (US)

(72) Inventor: Michael A. Wu, Fountain Hills, AZ (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 67 days.

(21) Appl. No.: 15/242,800

(22) Filed: Aug. 22, 2016

(65) Prior Publication Data

US 2018/0052046 A1   Feb. 22, 2018

(51) Int. Cl.
    *G01J 1/44*     (2006.01)
    *H04N 5/335*    (2011.01)
    *G01J 1/42*     (2006.01)

(52) U.S. Cl.
    CPC ............... *G01J 1/44* (2013.01); *G01J 1/4228* (2013.01); *H04N 5/335* (2013.01)

(58) Field of Classification Search
    CPC ........... G01J 2001/448; G01J 2001/446; G01J 2001/444; G01J 2001/4406; G01J 1/4228; G01J 2001/4233; G01J 1/42; H04N 1/03; H04N 1/031; H04N 1/193; H04N 3/1581; H04N 5/335; H04N 5/345; H04N 5/341; H01L 27/14825; H03F 1/303; H03F 1/3241; H03F 1/3247; H03F 1/38
    See application file for complete search history.

(56) References Cited

U.S. PATENT DOCUMENTS

| | | | | | |
|---|---|---|---|---|---|
| 3,988,689 | A | * | 10/1976 | Ochi ..................... | H03F 1/303 327/91 |
| 4,543,536 | A | * | 9/1985 | Pederson ............... | H03F 3/70 330/107 |
| 4,755,768 | A | * | 7/1988 | Shimokawa ........... | H03F 1/303 330/290 |
| 4,760,345 | A | * | 7/1988 | Busser ................. | G06G 7/1865 327/341 |
| 4,760,346 | A | * | 7/1988 | Kultgen ................ | G06G 7/14 327/408 |
| 5,084,639 | A | * | 1/1992 | Ribner .................. | H03F 1/303 250/370.09 |
| 5,267,335 | A | * | 11/1993 | Mita .................... | G06K 9/60 250/208.1 |
| 5,717,361 | A | * | 2/1998 | Saito ................... | G11B 5/02 330/290 |
| 5,724,095 | A | * | 3/1998 | Shyu ................... | G11C 27/026 330/9 |

(Continued)

*Primary Examiner* — John Lee
(74) *Attorney, Agent, or Firm* — The Noblitt Group, PLLC; Hettie L. Haines

(57) ABSTRACT

Various embodiments of the present technology may comprise methods and apparatus for a light sensor with a precharge circuit, such as for charging an internal node of a sensor to a starting voltage equal to an ending voltage of a different sensor. The methods and apparatus may comprise sequentially reading out the voltages of photosensitive elements and selectively activating the precharge circuit of one sensor during readout of the last photosensitive element of a different sensor.

16 Claims, 6 Drawing Sheets

(56) References Cited

U.S. PATENT DOCUMENTS

| | | | | |
|---|---|---|---|---|
| 5,764,103 A * | 6/1998 | Burra | | H03F 1/303 330/51 |
| 5,796,300 A * | 8/1998 | Morgan | | H03F 1/303 330/51 |
| 5,912,584 A * | 6/1999 | Iizuka | | H03F 1/303 330/290 |
| 6,433,632 B1 * | 8/2002 | Nakamura | | G11C 27/026 327/124 |
| 9,253,418 B2 * | 2/2016 | Warashina | | G01J 5/00 |
| 9,774,807 B2 * | 9/2017 | Asaba | | H04N 1/486 |
| 2001/0011923 A1 * | 8/2001 | Bakker | | H03F 1/303 330/9 |
| 2002/0113645 A1 * | 8/2002 | Lauffenburger | | H03F 1/303 330/9 |
| 2003/0155483 A1 * | 8/2003 | Yokomichi | | H01L 27/14678 250/208.1 |
| 2005/0094222 A1 * | 5/2005 | Tseng | | H04N 1/031 358/483 |
| 2005/0157192 A1 * | 7/2005 | Hosier | | H04N 3/1562 348/294 |
| 2005/0269487 A1 * | 12/2005 | Ozawa | | G01J 1/02 250/214 R |
| 2010/0013811 A1 * | 1/2010 | Ahn | | G09G 3/2003 345/207 |
| 2010/0271517 A1 * | 10/2010 | De Wit | | H04N 5/378 348/294 |
| 2010/0277624 A1 * | 11/2010 | Tan | | G01J 1/0252 348/244 |
| 2011/0221946 A1 * | 9/2011 | Joshi | | H03F 3/082 348/300 |
| 2012/0242407 A1 * | 9/2012 | Yan | | H03F 1/303 330/251 |
| 2012/0312967 A1 * | 12/2012 | De Wit | | H04N 5/3575 250/214 A |
| 2014/0008754 A1 * | 1/2014 | Ishihara | | H01L 27/14634 257/443 |
| 2014/0239161 A1 * | 8/2014 | Meynants | | H04N 5/353 250/214 SW |
| 2014/0252212 A1 * | 9/2014 | Xu | | G01J 1/4204 250/214.1 |
| 2014/0374570 A1 * | 12/2014 | Huin | | H04N 5/378 250/208.1 |
| 2015/0076321 A1 * | 3/2015 | Fowler | | H03F 3/16 250/208.1 |
| 2015/0189209 A1 * | 7/2015 | Yang | | H04N 5/378 348/300 |
| 2015/0237276 A1 * | 8/2015 | Hynecek | | H04N 5/363 348/300 |
| 2017/0350756 A1 * | 12/2017 | Panicacci | | G01J 1/4228 |
| 2018/0052046 A1 * | 2/2018 | Wu | | G01J 1/44 |

* cited by examiner

_US 10,145,734 B2_

METHODS AND APPARATUS FOR A LIGHT SENSOR

BACKGROUND

A linear light sensor (LLS) generally comprises a linear array of integrating photosensing pixels which measure incident light over a user-defined exposure time and generate a voltage or digital output which represents the light exposure of each pixel. The LLSs are available in a variety of lengths and pixel resolutions (DPI). The analog output may be directly interfaced to an analog-to-digital converter (ADC) for digital processing or comparing black/white thresholds.

Due to power and operating constraints, the photosensing pixels may be formed on multiple integrated chips (ICs), where the ICs are connected to a common bus. Readout of the photosensing pixels is performed in a sequential manner. Conventional architectures may suffer from longer and/or differing settling time of the output voltage during pixel readout. This condition may be observed between readout of the last photosensing pixel of one IC and the first photosensing pixel of the next IC. This condition is exacerbated even further as the clock speed of the system is increased. This condition leads to erroneous values for the first pixel of each IC and may result in artifacts in the final image.

BRIEF DESCRIPTION OF THE DRAWINGS

A more complete understanding of the present technology may be derived by referring to the detailed description when considered in connection with the following illustrative figures. In the following figures, like reference numbers refer to similar elements and steps throughout the figures.

DETAILED DESCRIPTION OF EXEMPLARY EMBODIMENTS

The present technology may be described in terms of functional block components and various processing steps. Such functional blocks may be realized by any number of components configured to perform the specified functions and achieve the various results. For example, the present technology may employ various processors, controllers, timing devices, photosensitive elements, semiconductor devices, switching devices, and the like, which may carry out a variety of functions. In addition, the present technology may be practiced in conjunction with any suitable imaging system and the apparatus and methods described are merely exemplary applications for the technology.

Methods and apparatus for a light sensor according to various aspects of the present technology may operate in conjunction with any suitable imaging system, such as contact image sensing, optical character recognition (OCR), edge detection, and object measurement in products such as copiers, document scanners, and spectroscopy.

Figure 1:
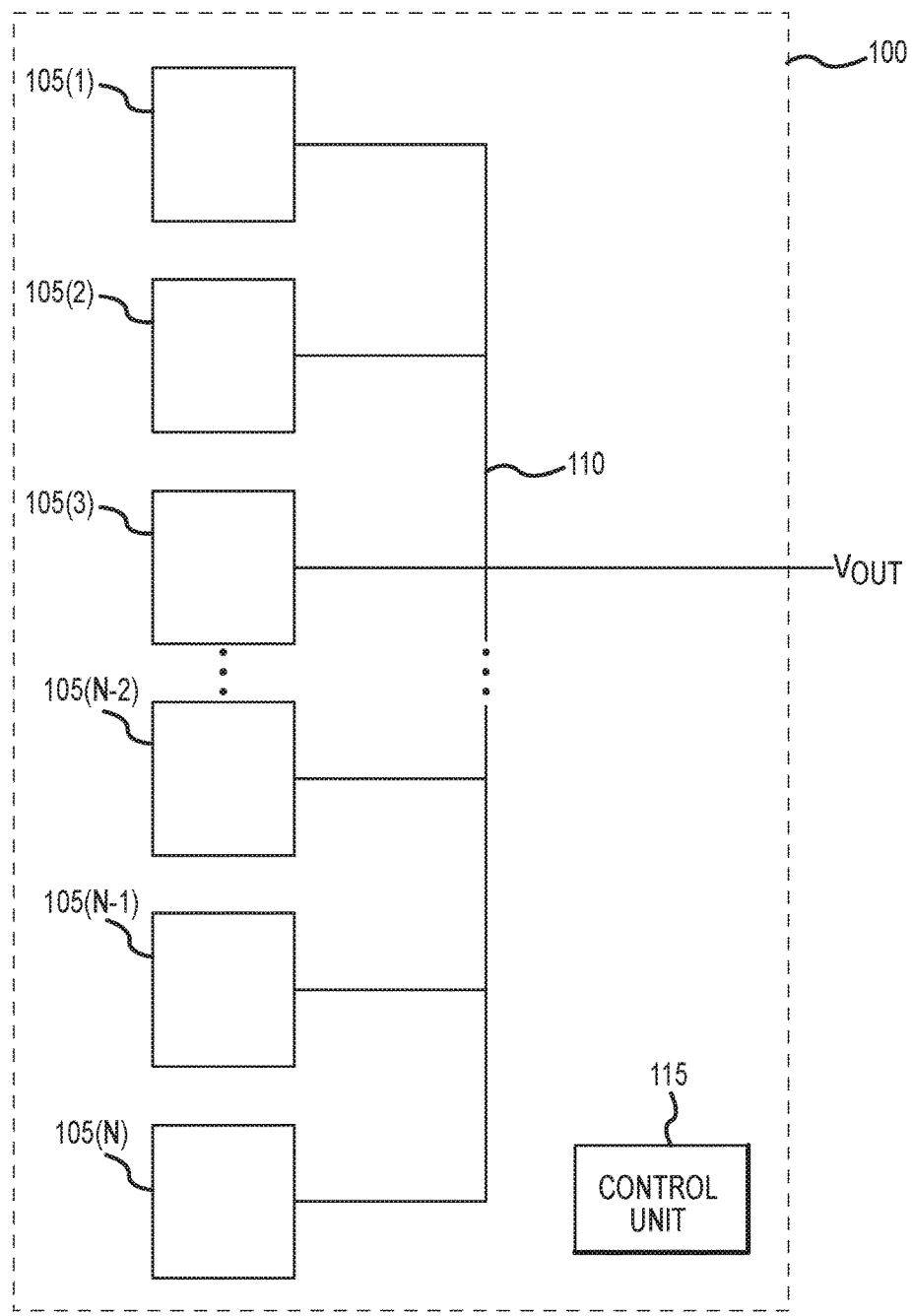
FIG. 1 is a block diagram of a light sensor module in accordance with an exemplary embodiment of the present technology.

Referring to FIG. 1, a light sensor module 100 may comprise a plurality of sensors 105(1):105(N), an output bus 110, and a control unit 115. Each of the sensors 105(1):105(N) may generate an analog signal with an output voltage Vout. In various embodiments, the sensors 105(1):105(N) may be electrically connected to and share the output bus 110 for signal transmission. In various embodiments, the signal may be transmitted to a companion device (not shown) via the output bus 110. In various embodiments, the light sensor module 100 may comprise any number of sensors 105 suitable for a particular application. The light sensor module 100 may comprise multiple ICs, wherein each sensor 105 forms one IC.

Figure 2:
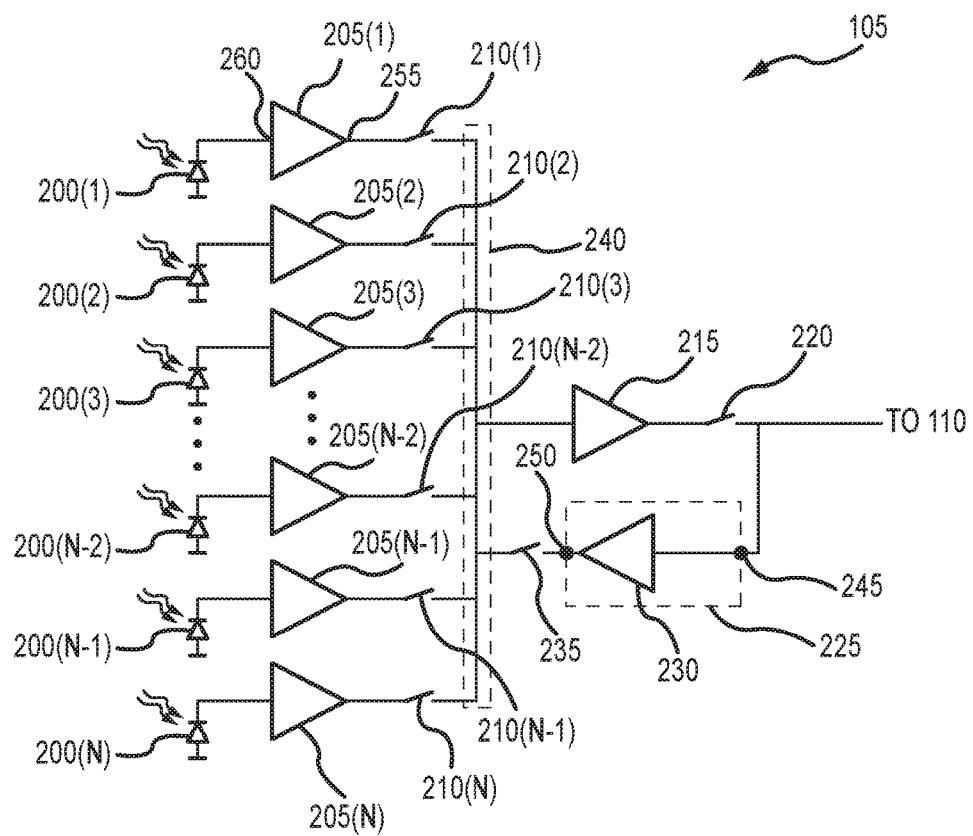
FIG. 2 is a schematic diagram of a light sensor IC in accordance with an exemplary embodiment of the present technology.

Referring to FIG. 2, in an exemplary embodiment of the present technology, each sensor 105 may comprise a plurality of photosensitive elements 200(1):200(N). The photosensitive elements 200(1):200(N) operate by converting light into an electric charge and may comprise a photodiode, a photogate, or any other appropriate semiconductor device responsive to light. In various embodiments, the sensor 105 may comprise any number of photosensitive elements 200 suitable for a particular application.

In various embodiments, the sensor 105 may further comprise a plurality of switchable first-stage amplifiers 205(1):205(N). In an exemplary embodiment, each switchable first-stage amplifier 205 may be coupled to one of the photosensitive elements 200. The switchable first-stage amplifier 205 may increase the signal from the photosensitive element 200 and prepare the signal for further amplification and processing. Each first-stage amplifier 205 may be formed from any suitable semiconductor components, such as transistors, resistive elements, capacitors, and the like.

In various embodiments, the switchable first-stage amplifier 205 may selectively couple the signal from the photosensitive element 200 to a common node 240. In one embodiment, the switchable first-stage amplifier 205 may be enabled or disabled by maintaining a particular impedance state. For example, the switchable first-stage amplifier 205 may be enabled by maintaining a low-impedance state, which permits signal propagation to the common node 240. Alternatively, the switchable first-stage amplifier 205 may be disabled by maintaining a high-impedance state, which impedes signal propagation to the common node 240.

In an exemplary embodiment, the switchable first-stage amplifier 205 may comprise a first switching device 210. In various embodiments, the first switching device 210 selectively couples the photosensitive element 200 to the common node 240. In one embodiment, the first switching device 210 selectively couples an output terminal 255 of the first-stage amplifier 205 to the common node 240. In an alternative embodiment, the first switching device 210 selectively couples the photosensitive element 200 to an input terminal 260 of the first-stage amplifier 205. The first switching device 210 may comprise a transistor or any other semiconductor device suitable for selectively coupling one or more circuits. The first switching device 210 may receive a control signal transmitted by the control unit 115 for operating electrical flow.

In other embodiments, however, switching may be achieved by enabling or disabling the first-stage amplifiers 205, for example, the first-stage amplifier 205 may comprise an enable/disable function that changes the output of the first-stage amplifier 205 by applying a logic level associated with a disable mode or an enable mode to an enable/disable control pin (not shown). When the disable mode is asserted, the power is reduced and the output of the disabled amplifier goes to a high-impedance state. As such, when the first-stage amplifier 205 is in the disable mode, the first-stage amplifier 205 is effectively switched off because signal propagation to the output bus 110 is impeded.

In various embodiments, the common node 240 may be defined as a point in the circuit where two or more circuit elements meet, for example, the common node 240 may be coupled to each photosensitive element 200 via the switchable first-stage amplifier 205. In various embodiments, the common node 240 may be charged to a starting voltage prior to readout of the photosensitive elements 200.

In various embodiments, the sensor 105 may comprise a switchable second-stage amplifier 215 coupled to the common node 240 for transforming the voltage on the common node 240. For example, the switchable second-stage amplifier 215 may transform the voltage to a higher value or to a lower value. In an exemplary embodiment, the switchable second-stage amplifier 215 comprises a voltage buffer amplifier.

In various embodiments, the switchable second-stage amplifier 215 may selectively couple the signal from the common node 240 to the output bus 110. The switchable second-stage amplifier 215 may increase the voltage on the common node 240 by a predetermined voltage gain B. Each of the second-stage amplifiers 215 may be formed from any suitable semiconductor components, such as transistors, resistive elements, capacitors, and the like.

In one embodiment, the switchable second-stage amplifier 215 may be enabled or disabled by maintaining a particular impedance state. For example, the switchable second-stage amplifier 215 may be enabled by maintaining a low-impedance state, which permits signal propagation to the output bus 110. Alternatively, the switchable second-stage amplifier 215 may be disabled by maintaining a high-impedance state, which impedes signal propagation to the output bus 110.

In an exemplary embodiment, the switchable second-stage amplifier 215 may comprise a second switching device 220 to selectively couple the second-stage amplifier 215 to the output bus 110. The second switching device 220 may comprise a transistor or any other semiconductor device suitable for selectively coupling one or more circuits. The second switching device 220 may receive a control signal transmitted by the control unit 115 for operating electrical flow.

In other embodiments, however, switching may be achieved by enabling or disabling the second-stage amplifiers 215, for example, the second-stage amplifier 215 may comprise an enable/disable function that changes the output of the amplifier 215 by applying a logic level associated with a disable mode or an enable mode to an enable/disable control pin (not shown). When the disable mode is asserted, the power is reduced and the output of the disabled amplifier goes to a high-impedance state. As such, when the second-stage amplifier 215 is in the disable mode, the second-stage amplifier 215 is effectively switched off because signal propagation to the output bus 110 is impeded.

In various embodiments, the sensor 105 may further comprise a precharge circuit 225. The precharge circuit 225 may be coupled between the output bus 110 and the common node 240.

In various embodiments, the precharge circuit 225 may comprise any number of semiconductor devices configured to receive an input voltage and generate an output voltage which is different from the input voltage. In various embodiments, the voltage gain of the precharge circuit 225 is proportional to the voltage gain of the switchable second-stage amplifier 215, such that the voltage gain of the precharge circuit is substantially equal to 1/B.

In various embodiments, the precharge circuit 225 may be selectively activated via a third switching device 235. In various embodiments, the third switching device 235 may be coupled between an output terminal 250 of the precharge circuit 225 and the common node 240. In alternative embodiments, the third switching device 235 may be coupled between the output bus 110 and an input terminal 245 of the precharge circuit 225.

In various embodiments, a substantial portion of the precharge circuit 225 may be formed on the same IC as the photosensitive elements 200. Alternatively, in other embodiments, a substantial portion of the precharge circuit 225 may be formed on a companion chip.

In an exemplary embodiment, the precharge circuit 225 comprises a feedback amplifier 230 with a voltage gain substantially equal to the inverse of the voltage gain of the switchable second-stage amplifier 215. For example, if the switchable second-stage amplifier 215 has a voltage gain B, then the feedback amplifier 230 may have a voltage gain substantially equal to 1/B.

Figure 5:
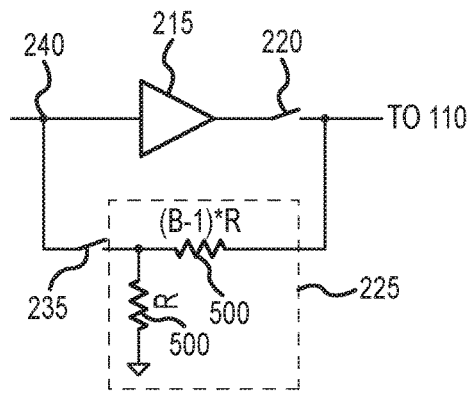
FIG. 5 is a schematic diagram of a precharge circuit in accordance with an exemplary embodiment of the present technology.

Referring to FIG. 5, in an alternative embodiment, where the voltage gain of the switchable second-stage amplifier 215 is greater than one (i.e., B>1), then the precharge circuit 225 may comprise resistive elements 500 to form a passive voltage divider, where the voltage gain of the precharge circuit 225 is less than one (i.e., 1/B<1). The voltage divider may comprise resistive elements 500, such as resistors, fixed capacitors, switched capacitors, and the like, or various combinations of resistive elements.

Figure 6:
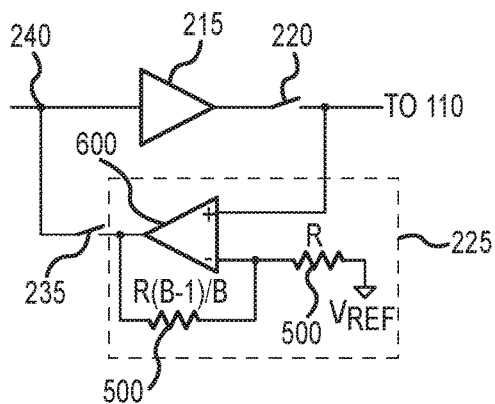
FIG. 6 is a schematic diagram of a precharge circuit in accordance with an exemplary embodiment of the present technology.

Referring to FIG. 6, in another embodiment, the precharge circuit 225 may comprise a non-inverting amplifier. The non-inverting amplifier may comprise a differential amplifier 600 and resistive elements 500 to form an active circuit. The resistive elements 500 may comprise resistors, fixed capacitors, switched capacitors, and the like. A positive input terminal of the amplifier 600 may be coupled to the output bus 110, while a negative input terminal is coupled to a reference voltage Vref. This topology may be desired if the switchable second-stage amplifier 215 is implemented as a source follower. In such a case, the voltage gain of the switchable second-stage amplifier 215 is less than one (i.e., B<1) and the voltage gain of the precharge circuit 225 is greater than one (i.e., 1/B>1).

Figure 7:
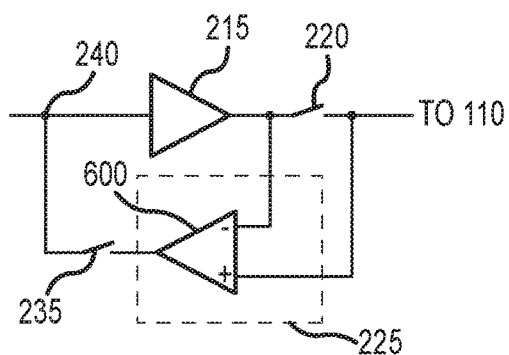
FIG. 7 is a schematic diagram of a precharge circuit in accordance with an exemplary embodiment of the present technology.

Referring to FIG. 7, in another embodiment, the precharge circuit 225 may comprise the differential amplifier 600, wherein a positive input terminal is coupled to the output bus 110 and a negative input terminal is coupled to the output of the switchable second-stage amplifier 215. This topology may be desired to reduce variations in circuit performance due to uncorrelated process parameters and errors introduced by an offset voltage of the switchable second-stage amplifier 215 since the differential amplifier 600 may utilize both the feedback output of the switchable second-stage amplifier 215 and the voltage on the output bus 110 while the third switching device 235 is closed and the second switching device 220 is open.

Figure 8:
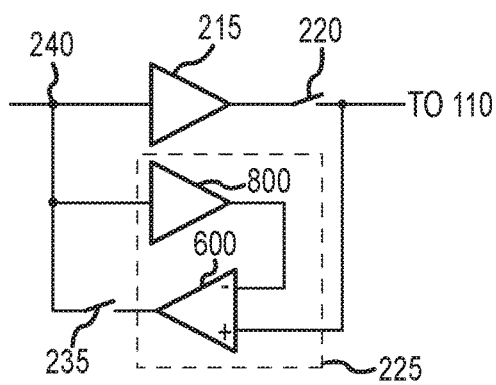
FIG. 8 is a schematic diagram of a precharge circuit in accordance with an exemplary embodiment of the present technology.

Referring to FIG. 8, in another embodiment, the precharge circuit 225 may comprise an amplifier 800 operating in conjunction with the differential amplifier 600, wherein a positive input terminal is coupled to the output bus 110 and a negative input terminal is coupled to the output of the amplifier 800. In the present embodiment, an input terminal of the amplifier 800 is coupled to the common node 240. The amplifier 800 may be a scaled-down version of the switchable second-stage amplifier 215 capable of providing a voltage gain and offset voltage that is substantially equal to that of the switchable second-stage amplifier 215 while consuming less power than other embodiments of the precharge circuit 225.

In various embodiments, the precharge circuit 225 may be formed using any suitable fabrication methods and/or techniques, and may comprise any suitable semiconductor components, such as transistors, resistive elements, capacitors, and the like.

According to various embodiments, the light sensor module 100 may, for example, sequentially transmit the output voltage for each photosensitive element 200(1):200(N) of the first sensor device 105(1) to the first common node 240(1), transmit each output voltage from the first common node 240(1) to the output bus 110, and charge the second common node 240(2) of the second sensor device 105(2) to a starting voltage, wherein the starting voltage is substantially proportional to a final output voltage of the first sensor device 105(1). In embodiments where the light sensor module 100 comprises more than two sensors 105, the light sensor may then, for example, sequentially transmit the output voltage for each photosensitive element 200(1):200(N) of the second sensor device 105(2) to the second common node 240(2), transmit each output voltage from the second common node 240(2) to the output bus 110, and charge the third common node 240(3) of the third sensor device 105(3) to a starting voltage, wherein the starting voltage is substantially proportional to a final output voltage of the second sensor device 105(2). This process may continue for all sensor devices 105(1):105(N).

Figure 3:
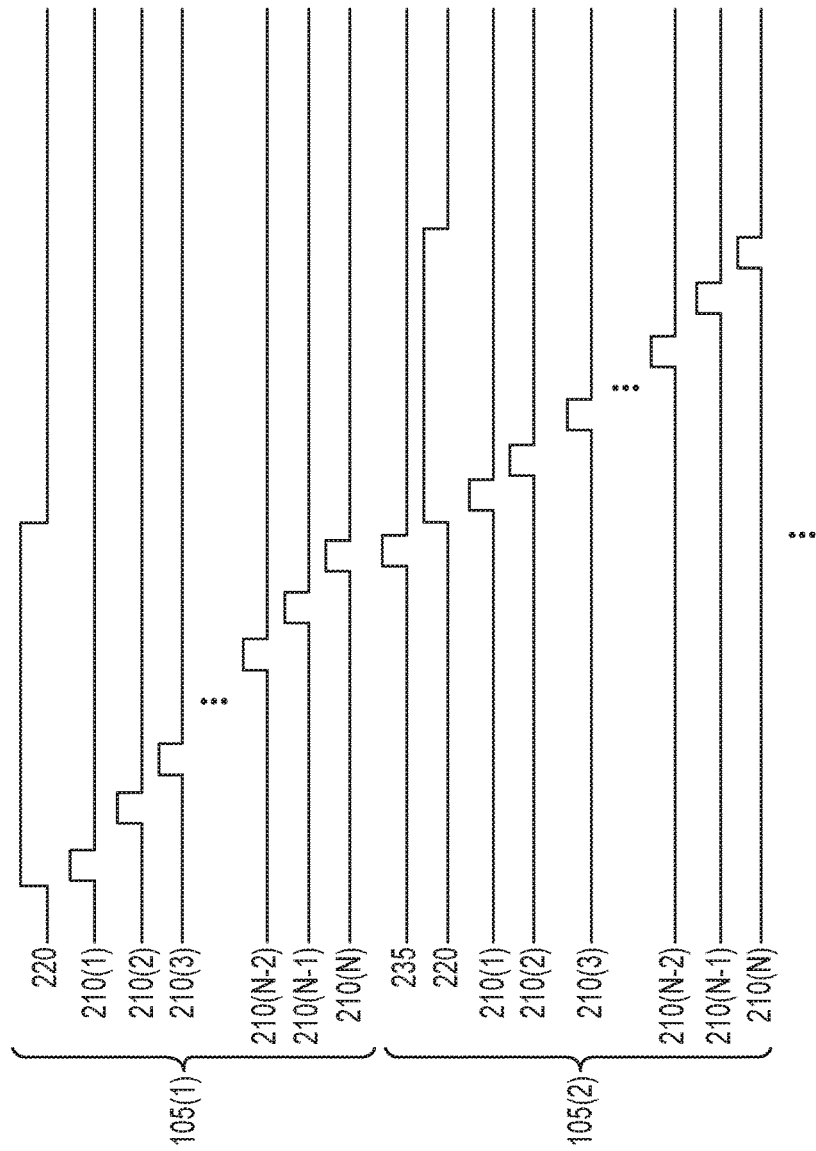
FIG. 3 representatively illustrates a timing diagram of a light sensor in accordance with an exemplary embodiment of the present technology.
Figure 4:
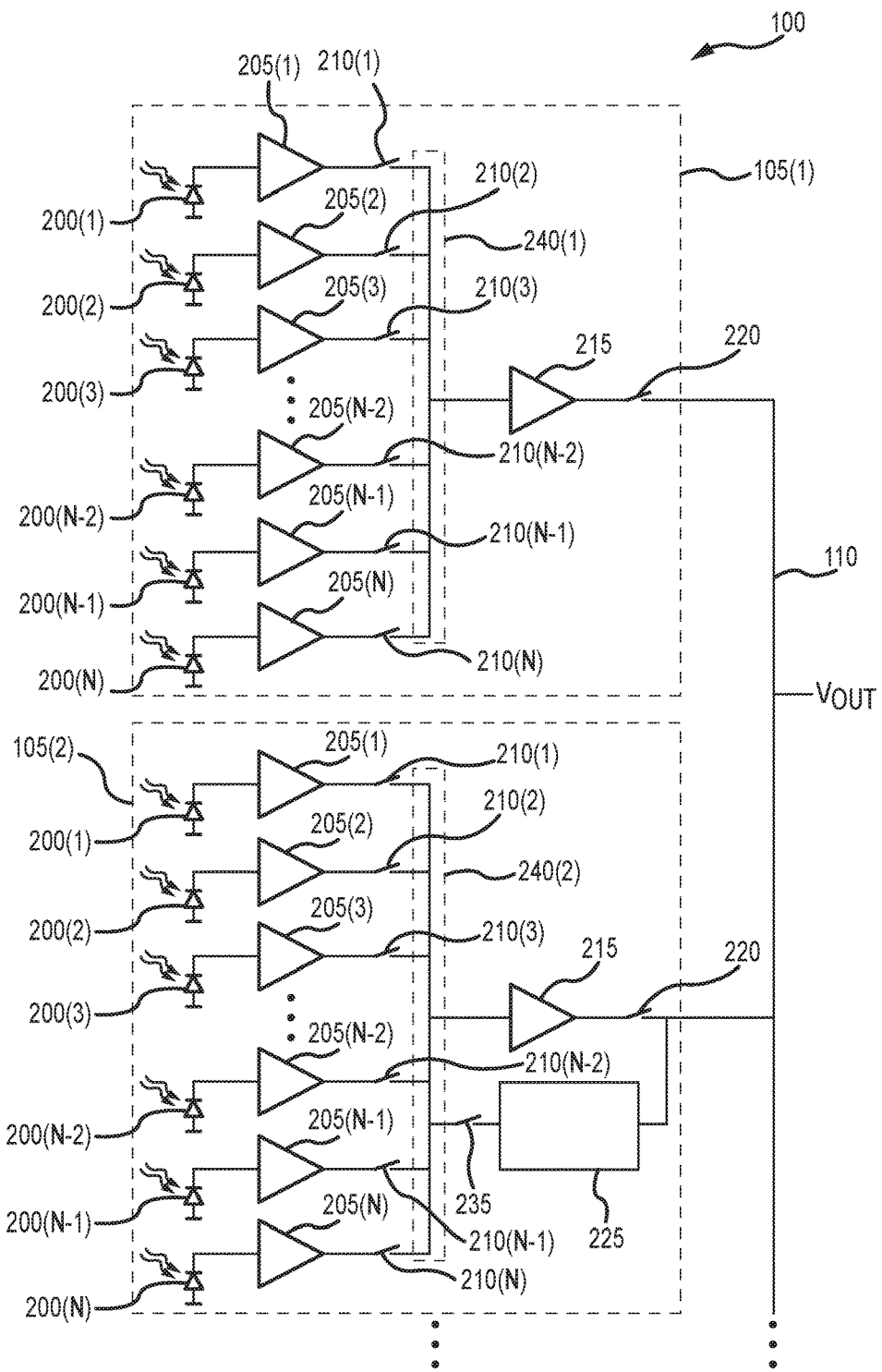
FIG. 4 is a schematic diagram of a light sensor in accordance with an exemplary embodiment of the present technology.

Referring to FIGS. 3 and 4, in operation, readout of the voltage from each of the photosensitive elements 200 may be performed in a sequential manner. Each of the first switching devices 210(1):210(N), the second switching device 220 and third switching device 235 may receive a control signal from the control unit 115 (FIG. 1). When the control signal is pulsed high, the switching device 210, 220, 235 is closed ("on"). When the control signal is low, the switching device 210, 220, 235 is open ("off").

In an exemplary embodiment, the photosensitive elements 200 from a first sensor 105(1) may be read out by transmitting control signals to each of the first switching devices 210(1):210(N), wherein each signal is pulsed high sequentially, such that only one photosensitive element 200 may be read out at a given time. The control signal to the second switching device 220 may be pulsed high during the entire read out of the photosensitive elements 200(1):200(N), or may be pulsed high simultaneously with the high pulse signals to the switching devices 210(1):210(N). During readout, the output voltages Vout of each photosensitive element 200(1):200(N) may be measured from output bus 110.

In various embodiments, while the last photosensitive element 206(N) is being read out, the control signal operating the third switching device 235 of a second sensor 105(2) is pulsed high. Applying a high pulse to the third switching device 235 of the second sensor 105(2) at substantially the same time as the last photosensitive element 206(N) is being read out effectively couples the common node 240 of the second sensor 105(2) to the output bus 110 by providing current flow. By supplying a transmission route, a voltage is applied to the common node 240 of the second sensor 105(2) via the precharge circuit 225 of the second sensor 105(2). In an exemplary embodiment, the output voltage Vout may be scaled by the precharge circuit 225, such that the starting voltage applied to common node 240 may be less than the output voltage Vout. For example, the precharge circuit 240 may apply a voltage gain equal to the inverse of the voltage gain of the second-stage amplifier 215 to the output voltage Vout on the output bus 110, wherein the output voltage of the precharge circuit 225 may be defined as the starting voltage. The readout operation of the photosensitive elements 200(1):200(N) of subsequent sensors 105(3):105(N) may proceed in the same manner described above.

In the foregoing description, the technology has been described with reference to specific exemplary embodiments. The particular implementations shown and described are illustrative of the technology and its best mode and are not intended to otherwise limit the scope of the present technology in any way. Indeed, for the sake of brevity, conventional manufacturing, connection, preparation, and other functional aspects of the method and system may not be described in detail. Furthermore, the connecting lines shown in the various figures are intended to represent exemplary functional relationships and/or steps between the various elements. Many alternative or additional functional relationships or physical connections may be present in a practical system.

The technology has been described with reference to specific exemplary embodiments. Various modifications and changes, however, may be made without departing from the scope of the present technology. The description and figures are to be regarded in an illustrative manner, rather than a restrictive one and all such modifications are intended to be included within the scope of the present technology. Accordingly, the scope of the technology should be determined by the generic embodiments described and their legal equivalents rather than by merely the specific examples described above. For example, the steps recited in any method or process embodiment may be executed in any order, unless otherwise expressly specified, and are not limited to the explicit order presented in the specific examples. Additionally, the components and/or elements recited in any apparatus embodiment may be assembled or otherwise operationally configured in a variety of permutations to produce substantially the same result as the present technology and are accordingly not limited to the specific configuration recited in the specific examples.

Benefits, other advantages and solutions to problems have been described above with regard to particular embodiments. Any benefit, advantage, solution to problems or any element that may cause any particular benefit, advantage or solution to occur or to become more pronounced, however, is not to be construed as a critical, required or essential feature or component.

The terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same.

The present technology has been described above with reference to an exemplary embodiment. However, changes and modifications may be made to the exemplary embodiment without departing from the scope of the present technology. These and other changes or modifications are intended to be included within the scope of the present technology, as expressed in the following claims.

The invention claimed is:

1. A sensor comprising:
  a plurality of photosensitive elements;
  a plurality of switchable first-stage amplifiers, wherein each switchable first-stage amplifier is coupled directly between one of the photosensitive elements and a common node;
  a switchable second-stage amplifier coupled between the common node and an output bus; and
  a precharge circuit coupled between the output bus and the common node.

2. The sensor of claim 1, wherein each switchable first-stage amplifier comprises a first switching device.

3. The sensor of claim 2, wherein the switchable second-stage amplifier comprises a second switching device.

4. The sensor of claim 3, further comprising a third switching device, wherein the third switching device selectively couples an output terminal of the precharge circuit to the common node.

5. The sensor of claim 3, further comprising a third switching device, wherein the third switching device selectively couples the output bus to an input terminal of the precharge circuit.

6. The sensor of claim 1, wherein the switchable second-stage amplifier has a voltage gain of less than 1.

7. The sensor of claim 6, wherein the precharge circuit comprises an amplifier with a voltage gain equal to the inverse of the voltage gain of the second-stage amplifier.

8. The sensor of claim 1, wherein the plurality of photosensitive elements is arranged in a linear array.

9. The sensor of claim 1, wherein the precharge circuit is formed on a same chip as the plurality of photosensitive elements.

10. A light sensor system, comprising:
  a plurality of sensors coupled via an output bus, wherein at least one sensor comprises:
    a plurality of photosensitive elements;
    a plurality of switchable first-stage amplifiers, wherein each switchable first-stage amplifier is coupled between one of the photosensitive elements and a common node;
    a switchable second-stage amplifier, wherein an input terminal of the switchable second-stage amplifier is coupled to the common node and an output terminal of the switchable second-stage amplifier is coupled to an output bus; and
    a precharge circuit, wherein an input terminal of the precharge circuit is coupled to the output bus and an output terminal of the precharge circuit is coupled to the common node.

11. The light sensor system of claim 10, wherein each switchable first-stage amplifier comprises a first switching device.

12. The light sensor system of claim 11, further comprising a control unit, wherein the control unit sequentially activates the first switching devices.

13. The light sensor system of claim 10, wherein the plurality of photosensitive elements is arranged in a linear array.

14. The light sensor system of claim 10, wherein the switchable second-stage amplifier has a voltage gain of less than 1.

15. The light sensor system of claim 14, wherein the precharge circuit comprises an amplifier with a voltage gain equal to the inverse of the voltage gain of the second-stage amplifier.

16. The light sensor system of claim 10, wherein the precharge circuit is formed on a same chip as the plurality of photosensitive elements.

* * * * *